United States Patent

[11] 3,568,641

| [72] | Inventor | Peter Kilham<br>20 Pleasant St., West Barrington, R.I. 02890 |
|---|---|---|
| [21] | Appl. No. | 803,583 |
| [22] | Filed | Mar. 3, 1969 |
| [45] | Patented | Mar. 9, 1971 |

[54] BIRD FEEDER
5 Claims, 14 Drawing Figs.

[52] U.S. Cl. .................................................. 119/51
[51] Int. Cl. ............................................. A01k 39/00
[50] Field of Search .......................................... 119/51, 52, 63, 53

[56] References Cited
UNITED STATES PATENTS

| 2,077,208 | 4/1937 | Brady | 119/24X |
| 2,306,312 | 12/1942 | Hyde | 119/51 |
| 2,634,705 | 4/1953 | Mayes | 119/51 |
| 2,699,753 | 1/1955 | Poiley | 119/52 |
| 2,705,938 | 4/1955 | Greenough | 119/52 |

*Primary Examiner*—Hugh R. Chamblee
*Attorney*—Salter and Michaelson

ABSTRACT: A bird feeder comprising a vertically disposed hollow housing having an opening in a sidewall thereof of a size just sufficient to receive the head or beak of a bird, perch means extending outwardly from the housing just below said opening, and baffle means inside the housing adjacent the top said aperture whereby when the housing is filled with bird seed, the baffle will deflect the seed away from the aperture and at the same time automatically maintain a level of bird seed adjacent the bottom of the aperture for ready access of a bird positioned on the aforesaid perch.

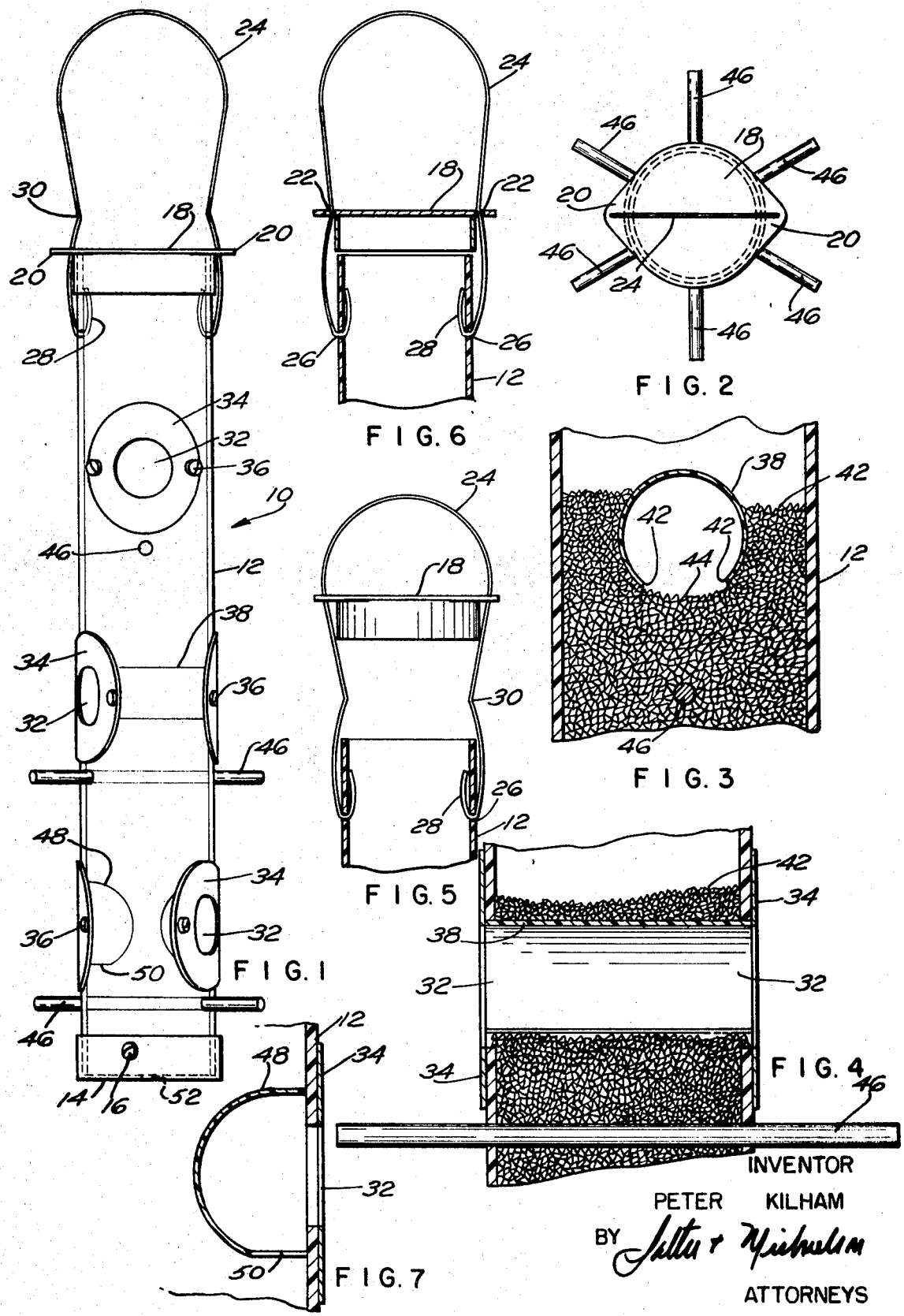

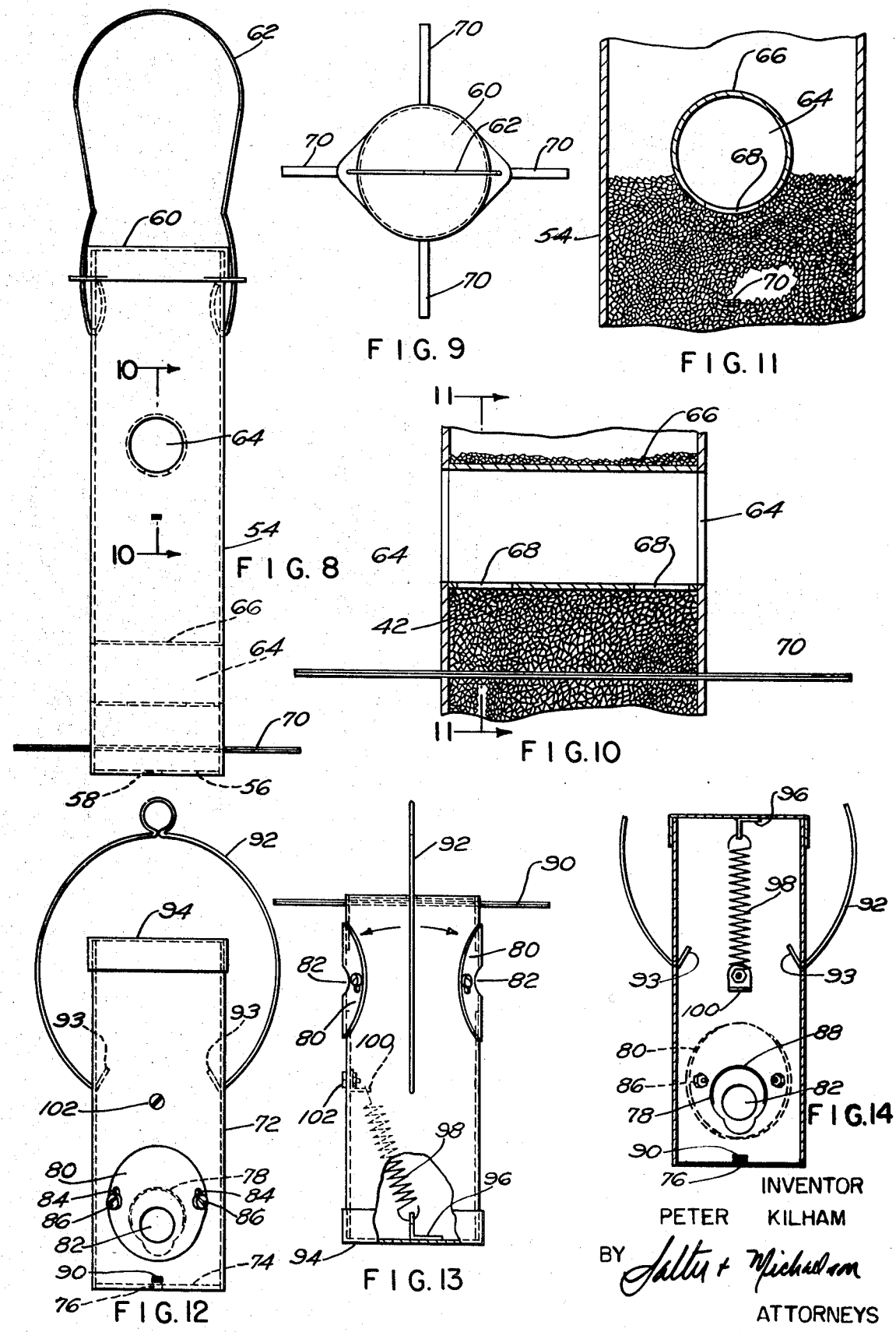

BIRD FEEDER

BACKGROUND OF THE INVENTION

Previously known bird feeders have been subject to numerous disadvantages. First and foremost, a serious problem exists with squirrels and similar animals gaining access to the feeder and either destroying it or at the very least causing the bird seed to be spilled therefrom.

Another serious problem that exists with prior bird feeders is the fact that they are not designed to feed a plurality of birds at one time as a result of which the birds literally fight with each other to gain access to the feeder with the usual result that the more pugnacious birds, such as bluejays and the like, frighten away the smaller and more timid birds whereby the latter end up with no feed at all, more often than not.

Prior feeders have also been susceptible to the elements wherein the feed frequently becomes spoiled by rain and wherein wind causes spillage and waste of the feed.

Another problem that frequently exists is the fact that when the accessible seed is eaten by a bird, the remaining seed in the feeder becomes difficult for the bird to reach, whereupon the feeder must either be agitated to again position the feed at an accessible position, or repeatedly refilled.

SUMMARY OF THE INVENTION

It is a primary object of the instant invention to provide a bird feeder that is of sufficient structural strength so as to resist mutilation and destruction by squirrels and similar animals and which at the same time is designed so as to prevent access to the seeds by such animals.

Another object is the provision of a bird feeder having a plurality of separated feed stations whereby a plurality of birds may feed at one time without interference with each other.

Still another important object of this invention is the provision of a multistation bird feeder that is self-metering in nature so that the bird feed at each station automatically remains at the proper level.

A further object is the provision of a bird feeder designed so as not be be adversely affected by wind and rain.

Another object is the provision of a bird feeder having feed openings dimensioned so as to permit desired birds to feed from the device but at the same time prevent larger birds and animals from gaining access to the bird seed.

Additional objects involve the provision of a bird feeder having a removable top thereon with novel and improved means for releasably maintaining the top in closed position; the provision of a bird feeder having novel and improved perch means and the provision of a feeder capable of effectively functioning with large granule seeds as well as small granule seeds and further including adjustable means for compensating for the size of the seeds.

DESCRIPTION OF THE DRAWINGS

FIG. 1 is an elevational view of a bird feeder constructed in accordance with my invention;

FIG. 2 is a top plan view thereof;

FIG. 3 is an enlarged fragmentary elevational view in section;

FIG. 4 is an enlarged fragmentary elevational view in section showing one type of feeding station used in my invention;

FIG. 5 is a fragmentary elevational view showing the cover in open position;

FIG. 6 is a view similar to FIG. 5 showing the cover just prior to reaching closed position;

FIG. 7 is a fragmentary elevational view, in section, showing another form of feeding station used in my invention;

FIG. 8 is an elevational view of a modified bird feeder;

FIG. 9 is a top plan view thereof;

FIG. 10 is an enlarged fragmentary section taken on line 10–10 of FIG. 8;

FIG. 11 is a section taken on line 11–11 in FIG. 10;

FIG. 12 is an elevational view of a further modification of my invention;

FIG. 13 is an elevational view showing the feeder of FIG. 12 rotated about its longitudinal axis approximately 90° and pivoted about its supporting bail to an upside down position; and FIG. 14 is an elevational view showing the inside of the feeder of FIG. 12.

DESCRIPTION OF THE INVENTION

Referring now to the drawings, and more particularly to the form of my invention shown in FIGS. 1 through 7, there is shown generally at 10 a bird feeder comprising a hollow cylindrical tube 12 constructed of any suitable material although I prefer to utilize a transparent plastic so that the bird seed will be visible to the birds from outside the feeder. The tube 12 has a bottom wall 14 preferably in the form of a cap that surrounds the bottom of the tube and that is secured thereto by any suitable means, such as screw 16, as shown most clearly in FIG. 1. The bottom wall 14 is preferably of metallic construction to impart greater strength and rigidity to the feeder 10.

At its upper end the feeder 10 is provided with a cover 18, also preferably of metallic construction. Cover 18, like bottom wall 14, is preferably in the form of a cap that telescopes the end of tubing 12, and, as will be noted, the cover 18 is provided with diametrically opposed lateral extensions 20, each of which has an eye 22 therein. The feeder 10 is adapted to be suspended in a vertically disposed position from a tree branch or any other suitable support and to this end there is provided a wire bail 24, the free ends of which pass through diametrically opposed openings 26 adjacent the upper end of tube 12 and terminate in hooked portions 28, as shown most clearly in FIGS. 1, 5 and 6. It is important to note that opposite sides of the bail 24 are threaded through the aforesaid eyes 22 and the bail is provided with oppositely disposed indentations 30 located a short distance above cover 18 when the latter is in closed position. The configuration of the wire bail 24, as defined by indentations 30, cooperates to resiliently maintain the cover 18 in closed position, although when it is desired to open the cover 18, it is simply necessary to force it upwardly against the resilient action of bail 24, as shown in FIG. 6, and then by moving the cover further upwardly along the bail, as shown in FIG. 5, the cover will remain in open position in order to permit access to the top of the feeder when it is desired to fill same with bird seed.

The feeder 10 is provided with a plurality of feeding stations each of which comprises an aperture 32 in the wall of tubing 12. Each aperture 32 has an aligned aperture diametrically opposed thereto, as shown most clearly in FIG. 4. As will be seen most clearly in FIG. 1, each set of diametrically opposed apertures is circumferentially staggered with respect to the apertures located thereabove. Since squirrels and animals have been known to chew and mutilate plastic feeders, each aperture 32 is provided with a protective metal ring 34 secured to the outside surface of tubing 12 as by screws 36.

In order to prevent the bird seed from flowing out of the apertures 32, baffle means are provided inside tubing 12. One form of the baffle means is shown in detail in FIGS. 3 and 4 and it will be seen that the baffle comprises a tube 38 that extends diametrically across the tubular housing 12 from aperture 32 to the other aperture 32 that is diametrically opposed thereto. The tubular baffle 38 may be constructed of any desired material, such as plastic and preferably, although not necessarily, the tube is arcuate in cross section and extends substantially more than 180° as shown in FIG. 3, but has its lower edges 40 spaced from each other. Thus, when the feeder 10 is filled with bird seed 42 the seed will gravitate around the tubular baffles 38 and a level of bird seed will automatically form at the bottom of each baffle as at 44. Therefore, when a bird inserts its head through aperture 32, it has free access to the bird seed located at the bottom of baffle 38 and as the seed is eaten, agitated, etc., the seed will automatically move downwardly in feeder 10 to maintain the feed level 44 substantially constant, until the level of seed in feeder 10 drops below a particular aperture 32. Thus it will be seen that so long as the feeder 10 is maintained substantially full, the feed level of seed at each feed station will automatically maintain itself whereby my device is self-metering in nature.

In order to facilitate access to the feeding stations, perch means 46 are provided, said means comprising a stick or rod that extends diametrically through tubing 12 below each pair of aligned apertures 32. The rods 46 are preferably of metallic construction so as to be incapable of mutilation by squirrels and the like and said rods extend outwardly from opposite sides of tubing 12 sufficiently to provide a perch on which a bird may position itself. If desired, the rods may be plastic coated to prevent the birds from freezing to the rods in sub-freezing weather. The apertures 32 specifically are dimensioned so as to be large enough so that the head of a bird can pass therethrough for access to feed level 44, but small enough so that large birds such as bluejays and the like, and other animals such as squirrels, will have difficulty in gaining access to the bird seed. Since the feed stations are relatively widely scattered with respect to each other, a plurality of birds may feed simultaneously without interference with each other.

Referring to FIG. 7, and the lowermost feeding stations in FIG. 1, there is shown a slightly modified form of baffle means comprising a semispherical shell 48 secured to the inner wall of tube 12 so as to form an enclosure around the inside of each aperture 32 with the exception of opening 50 provided at the bottom thereof. This type of baffle means makes it even more difficult for squirrels and the like to get their paws into the feeder sufficiently to get at the feed so as to scrape it out of the feeder, etc. It will be noted, however, that whether baffle 38 or 48 is utilized, there is little possibility that wind will cause any substantial spillage and waste of the bird seed and it will further be obvious that rain will not have a substantial adverse affect on the feeder. Since, however, some limited degree of moisture might get into the feeder, a drain hole 52 is provided in bottom wall 14.

FIGS. 8 through 11 show a modified form of my invention that is highly squirrel-proof in that a metallic cylindrical housing 54 is provided having a bottom wall 56 with a drainage opening 58 therein. A cover 60 and suspending bail 62 functions in an identical manner to the aforedescribed cover 18 and bail 24 and hence further description of same is not deemed to be necessary. As in the previously described form of my invention, oppositely disposed apertures 64 are provided in tubular housing 54 with each set of apertures being circumferentially staggered with respect to the apertures located thereabove. In this form of my invention baffle means 66 comprise a metallic tubing that extends from one aperture to its oppositely disposed aperture said tubing being completely circular and providing a complete enclosure with the exception of openings 68 located at the bottom of tube 66 adjacent each of the apertures 64. The bird seed 42 forms a self-metering feed level adjacent the aperture 68 in the same manner as previously described in connection with the preferred form of my invention. Since the apertures 68 are of relatively small size, generally comparable in size to the aforesaid apertures 50 shown in FIG. 7, this arrangement is such that it is extremely difficult for a squirrel to surreptitiously remove bird feed from the device. The all-metal construction of the feeder additionally makes the device impervious to attack or mutilation by squirrels and the like.

The perch means in this form of my invention comprise a relatively thin and flexible wire 70 that extend through tubular housing 54 in the same manner as the aforedescribed rods 46. Since, however, the wire 70 is relatively fragile and flexible, it will not support a relatively heavy object such as a large bird or a squirrel, but at the same time it is of sufficient strength to support smaller birds for which the feeder is designed. It will be understood, of course, that the flexible perch means 70 could also be used in combination with the form of my invention illustrated in FIGS. 1 through 7.

FIGS. 12 through 14 show still another form of my invention wherein an all-metal cylindrical housing 72 is provided having a bottom wall 74 with a drainage opening 76 therein. The feeding station comprises diametrically opposed openings 78 in the wall of tubing 72, said openings each being covered with an outer cover plate 80 that has a relatively small aperture 82 therein. The plates 80 are provided with mounting slots 84 which receive screws 86 so that plate 80 and its aperture 82 may be vertically adjusted with respect to tube 70 for reasons hereinafter to be made apparent. An elongated baffle 88 extends diametrically across tube 72 and is located at the top of aperture 78, it being noted that said baffle is substantially semicircular in cross section. The baffle 88 functions in the same general manner as the aforedescribed baffle 38 except that the level of seed is located substantially at the halfway point of aperture 82. Due to the relatively small size of aperture 82, which is large enough to receive only the beak of a bird, it has been found that the seed does not flow out therethrough even though the seed level is at approximately the halfway point of the aperture. In order to maintain the seed level at substantially this halfway point, the plate 80 is moved to its lowermost position when relatively large granule seeds are employed, since such relatively large seeds do not flow so freely as the smaller seeds and hence the seed level determined by baffle 88 will be slightly lower where coarse seeds are used. On the other hand, where finer seeds are used, the plate 80 would be moved to its uppermost position as shown in FIG. 12. Perch means 90 similar to the aforedescribed perch 70 are provided.

In this form of my invention, a somewhat different cover and suspension arrangement is utilized. More specifically, a suspending bail 92 is provided having hooked ends 93 that pivotally interengage tube 72 slightly above the halfway point of the latter. Thus, when the feeder is suspended from a branch or the like, it will hang vertically, as shown in FIG. 12, but should a squirrel or other animal engage the top of the feeder, it will swing around its pivot on bail 92 to assume the upside down position shown in FIG. 13, thus causing the squirrel or other animal to lose its grip and fall off the feeder. Since in this form of my invention the cover 94 is not maintained closed by the suspending bail, spring means are provided inside the feeder for resiliently maintaining the cover in closed position. Said means comprise a bracket 96 secured to the inner surface of the cover which bracket receives one end of a spring 98, the opposite end being secured to a second bracket 100 secured to the wall of the tubular member as by screw 102. Thus, when the feeder is inverted to its upside down position, the spring 98 will maintain cover 94 in closed position. On the other hand, when it is desired to open cover 94 to refill the feeder, the cover may be lifted off the feeder against the action of spring 98.

I claim:

1. A bird feeder comprising a vertically disposed hollow housing comprising a peripheral sidewall, a removable top cover and a bottom wall, an aperture in said sidewall, a perch extending outwardly from said sidewall below said aperture whereby a bird may stand on said perch and insert its beak or head through said aperture, and baffle means comprising a hood member, the cross-sectional configuration of which generally corresponds to that of said aperture, said hood having an opening at its bottom portion adjacent to said aperture whereby when said housing is filled with a supply of seed, the hood will deflect the gravitating seeds so as to prevent the seeds from flowing out of said aperture, and at the same time automatically maintain a level of seed adjacent said aperture accessible to a bird through said aperture and opening, said housing being constructed of a cylindrical transparent plastic tube having a plurality of said apertures in vertically spaced relation and staggered circumferentially with respect to each other, each of said apertures having an aligned aperture in diametrically opposed relation, and a metal collar around the edge of each said aperture.

2. In the feeder of claim 1, said hood member comprising a tubular member extending diametrically across said housing from one aperture to its aligned opposite aperture, said tubular member being at least semicircular in cross section, but having lower edges terminating in spaced relation to define the aforesaid opening.

3. A bird feeder comprising a vertically disposed hollow housing comprising a peripheral sidewall, a removable top cover and a bottom wall, an aperture in said sidewall, a perch extending outwardly from said sidewall below said aperture whereby a bird may stand on said perch and insert its beak or head through said aperture, and baffle means comprising a hood member, the cross-sectional configuration of which generally corresponds to that of said aperture, said hood having an opening at its bottom portion adjacent to said aperture whereby when said housing is filled with a supply of seed, the hood will deflect the gravitating seeds so as to prevent the seeds from flowing out of said aperture, and at the same time automatically maintain a level of seed adjacent said aperture accessible to a bird through said aperture and opening, said housing comprising a metallic cylinder, said housing having a second aperture in diametrically opposed alignment with said aforesaid aperture, said hood member comprising a tubular member extending from one aperture to the other, the diameter of said tubular member being substantially equal to that of said aperture and said member defining a complete tube except for the aforesaid bottom openings, said openings being of smaller size than said apertures.

4. A bird feeder comprising a vertically disposed hollow housing comprising a peripheral sidewall, a removable top cover and a bottom wall, an aperture in said sidewall, a perch extending outwardly from said sidewall below said aperture whereby a bird may stand on said perch and insert its beak or head through said aperture, and baffle means comprising a hood member, the cross-sectional configuration of which generally corresponds to that of said aperture, said hood having an opening at its bottom portion adjacent to said aperture whereby when said housing is filled with a supply of seed, the hood will deflect the gravitating seeds so as to prevent the seeds from flowing out of said aperture, and at the same time automatically maintain a level of seed adjacent said aperture accessible to a bird through said aperture and opening, a suspending wire bail pivotally attached to said housing at a point where when the housing is supported by said bail, it will hang vertically, but wherein the housing will pivot around said bail to upside-down position in response to the positioning of a weighted object on the top of said housing.

5. A bird feeder comprising a vertically disposed hollow housing of generally tubular configuration having a peripheral sidewall, a removable top cover and a bottom wall, a pair of oppositely disposed aligned apertures in the sidewall of said housing, a perch extending outwardly from said sidewall below said apertures whereby a bird may stand on said perch and insert its beak or head through said aperture, and baffle means mounted within said housing over each aperture, said baffle means comprising a hood member, the cross-sectional configuration of which generally corresponds to that of said apertures, said hood having an open portion at its bottom extending to the inner surface of said sidewall adjacent the bottom of said apertures, whereby when said housing is filled with a supply of seed, the hood will deflect the gravitating seeds so as to prevent the seeds from flowing out of said apertures, and at the same time automatically maintain an unobstructed level of seed next to said aperture accessible to a bird through said aperture and open portion.